US012602759B2

(12) United States Patent
Ip et al.

(10) Patent No.: US 12,602,759 B2
(45) Date of Patent: Apr. 14, 2026

(54) VERIFICATION OF CRITICAL DISPLAY FRAME PORTIONS FOR MULTIPLE DISPLAYS IN A VIRTUAL MACHINE ENVIRONMENT

(71) Applicants: ATI TECHNOLOGIES ULC, Markham (CA); ADVANCED MICRO DEVICES, INC., Santa Clara, CA (US)

(72) Inventors: Clarence Ip, Markham (CA); Hsiao-Yu Lin, Taipei (TW)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/618,513

(22) Filed: Mar. 27, 2024

(65) Prior Publication Data

US 2025/0191156 A1      Jun. 12, 2025

Related U.S. Application Data

(60) Provisional application No. 63/607,700, filed on Dec. 8, 2023.

(51) Int. Cl.
| | |
|---|---|
| *G06T 7/00* | (2017.01) |
| *G06F 3/14* | (2006.01) |
| *G06T 11/00* | (2006.01) |

(52) U.S. Cl.
CPC .............. *G06T 7/0002* (2013.01); *G06F 3/14* (2013.01); *G06T 11/00* (2013.01); *G06T 2200/28* (2013.01)

(58) Field of Classification Search
CPC .......... G06F 3/14; G06F 7/0002; G06F 11/00; G06F 2200/28; G06T 7/0002; G06T 11/00; G06T 2200/28
See application file for complete search history.

(56) References Cited

U.S. PATENT DOCUMENTS

| | | | | |
|---|---|---|---|---|
| 9,955,150 | B2 * | 4/2018 | Gulati | .................. H04N 17/004 |
| 10,134,139 | B2 | 11/2018 | Gulati et al. | |
| 2014/0085324 | A1 * | 3/2014 | Charvet | ................. G09G 5/006 |
| | | | | 345/646 |
| 2018/0165814 | A1 * | 6/2018 | Gulati | ..................... G06T 7/001 |

* cited by examiner

*Primary Examiner* — Adam J Snyder

(57) ABSTRACT

A computing system includes a display controller and a processing device external to the display controller. The display controller includes a content verification circuit configured to generate a derived value representing visual content of interest (COI) within an image frame for a region of interest (ROI) on at least one display device. The processing device includes an error-detection circuit configured to perform an error-detection process for the visual COI based on the derived value.

20 Claims, 7 Drawing Sheets

VERIFICATION OF CRITICAL DISPLAY FRAME PORTIONS FOR MULTIPLE DISPLAYS IN A VIRTUAL MACHINE ENVIRONMENT

BACKGROUND

A processing system executing display applications typically generates an image(s) for display. In some instances, one or more portions of the image have a relatively high criticality level. For example, in a vehicle, such as an automobile, a processing system may generate an image to display to the driver, where some portions of the image have relatively low importance (e.g., a portion that displays an external temperature or a portion that displays media being played by the automobile), while other portions of the image have relatively high importance (e.g., a portion that displays a warning message that the engine temperature is too high). However, errors in image generation can result in the more critical portions of the image being improperly generated or displayed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
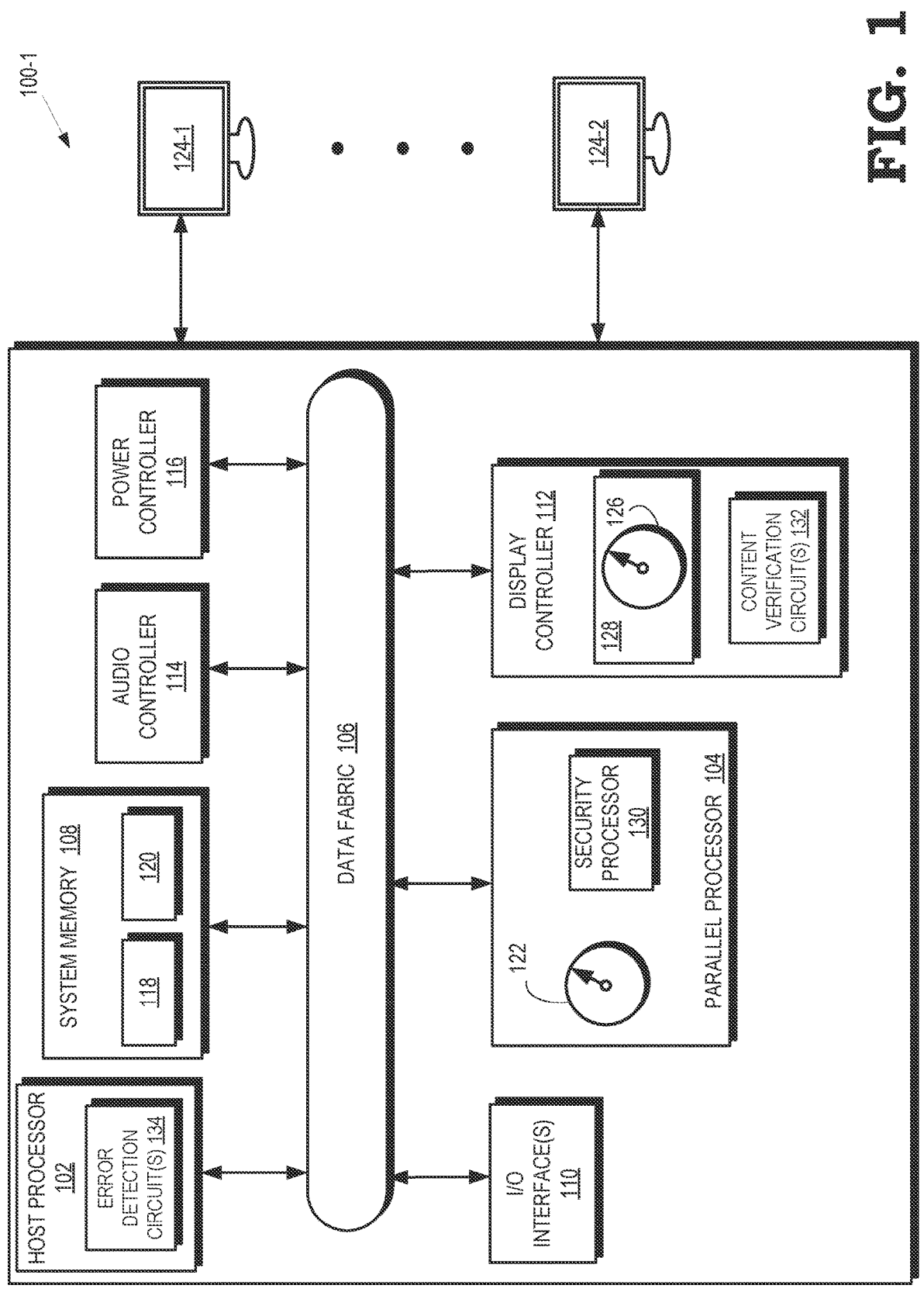
FIG. 1 is a block diagram of an example computing system in accordance with some implementations.

In a variety of display-oriented applications, a processing system is typically responsible for creating visual content intended for user interaction. Such a processing system assembles images, with certain segments of these visuals designated as more critical based on the level of importance and urgency of the information they convey. Consider, for instance, an automotive context in which the onboard processing system compiles an image for the driver's console display. Within this image, certain elements, such as the display areas showing ambient temperature readings or the multimedia being played within the vehicle, may not demand urgent attention from the driver, serving more as informative features rather than imperative alerts. In contrast, other segments of the same display present visual content having more significance or importance, such as an area of the display reserved for alerting the driver to critical vehicle conditions (e.g., an engine overheating warning). Critical portions or segments such as these are designed to draw immediate attention and provoke prompt action to prevent potential safety issues or mechanical failures. Despite the sophistication of such systems, the generation and rendering of images are not impervious to errors. Technical anomalies, glitches, or malicious activity can lead to the misrepresentation or complete omission of crucial information in the display output. When these errors affect the critical portions of an image, the consequences can be significantly adverse. For example, user experience, user safety, operational integrity, and the like are negatively affected.

To address these and other problems, FIG. 1 to FIG. 7 describe systems and methods for visual content verification that include one or more verification circuits that verify rendered display images submitted to a display subsystem have correctly reached the display controller hardware (e.g., without modification or omission by malicious or compromised software, software bugs, technical glitches, or the like). As described in greater detail below, a first processing device, such as a central processing unit (CPU), determines visual content to be presented on or more displays. The first processing device generates instructions, such as how to render an image or scene (e.g., geometry, texturing, lighting, and shading information) and data, such as graphics pipeline data (e.g., geometric data, textures, and lighting information), associated with the visual content. The first processing device also generates content of interest (COI) data that designates or identifies at least some of the visual content as being of interest or critical and further generates region of interest (ROI) data that indicates, for example, pixel coordinates corresponding to one or more ROIs within a frame that includes the visual content of interest.

The first processing device sends the instructions, graphics pipeline data, COI data, and ROI data to a second processing device, such as an accelerated processing (AP) device. In at least some implementations, the first processing device is an external device that provides the COI and ROI to the CPU, APU, or the like. The second processing device renders frames that include visual content for presentation by one or more display devices based on the instructions and graphics pipeline data received from the first processing device. For example, based on the instructions and graphics pipeline data, the second processing device renders objects to produce values of pixels that are provided by a display controller to one or more display devices, which use the pixel values to display an image that represents the rendered objects. The display controller reads out the pixel values in the frames from a buffer/memory and uses the values to generate one or more signals for displaying an image on (or presenting an image to) the one or more display devices.

The display controller, another component of the second processing device, or a display device itself, includes one or more content verification circuits. The content verification circuit(s) performs one or more operations on the visual content of interest to verify that this visual content was generated or displayed as intended. For example, given the COI data and the ROI data received from the first processing device, the content verification circuit identifies a frame that includes visual COI and the location in the frame where this visual content is expected. The content verification circuit calculates a derived value (e.g., a cyclic redundancy checksum) representing a region of pixel data from the display controller corresponding to the ROI as frames are scanned out to the display interface.

In at least some implementations, the content verification circuit sends the ROI coordinates and calculated derived value to the first processing device. The content verification circuit, in at least some implementations, sends the ROI coordinates and calculated derived value on a per-display frame basis or other timing interval. In other implementations, a third processing device obtains the ROI coordinates and calculated derived value from the display controller and sends this information to the first processing device. The third processing device, in at least some implementations, is a security-based processor situated within (or outside of) the second processing device. For example, the third processing device is a set of hardware structures generally configured to create, monitor, and maintain a secure environment for the second processing device. The third processing device, in at least some implementations, obtains the ROI coordinates and calculated derived value from the display controller on a per-display frame basis (or other timing interval) and sends this information to the first processing device. In at least some implementations, the third processing device transmits the ROI coordinates and calculated derived value to the first processing device using the inter-integrated circuit (I2C) communication protocol or another communication protocol.

The first processor receives the ROI coordinates and calculated derived value from either the content verification circuit or the third processing device and uses this information to determine if the visual COI presented on the display device(s) based on the signals received from the display controller where displayed correctly (e.g., within the ROI and without any modification or corruption). For example, the first processor, in at least some implementations, compares the received derived value to a derived value expected for the ROI coordinates received from the content verification circuit or the third processing device. If the derived values match, the first processor determines that the visual COI was displayed correctly. However, if the derived values do not match, the first processor determines that the visual COI was displayed incorrectly and performs one or more recovery actions, such as regenerating the visual COI.

As such, the techniques described herein ensure that visual COI is presented as expected and minimize the ability of any malicious software running on the first processor to interfere with the ROI coordinates being checked or the exported derived value/ROI data. Stated differently, the described techniques prevent any malicious or erroneous software from modifying information provided to an external agent (e.g., the first processor) verifying the visual content or otherwise falsely indicating that the expected pixels were provided to the display devices when they were not. Also, in implementations where the first processing device is external to the CPU, this configuration protects against malicious code running on the CPU itself. Moreover, the techniques enhance user safety and the overall user experience by ensuring that visual COI is displayed correctly. The described techniques provide this enhanced safety efficiently by only performing the error-checking process(es) for portions of one or more images having COI rather than the images as a whole. For example, system resources are only consumed to perform error checking on a relatively small number of pixels. Moreover, the techniques described herein are applicable to single-display and multi-display environments and virtualized and non-virtualized environments. For example, in a virtual environment implementing one or more virtual machines (VMs) and multiple displays, for each display, each virtual machine, or a combination thereof, the content verification circuit identifies visual COI to be displayed and performs the one or more error-checking processes described herein for the visual COI.

FIG. 1 illustrates a block diagram of a computing system 100 employing error detection and content verification circuits for verifying that visual content is properly displayed as intended in accordance with at least some implementations. The computing system 100, in at least some implementations, includes at least one or more processing devices, such as a host processor 102 and a parallel processor 104, a fabric 106, memory 108, an input/output (I/O) interface(s) 110, a display controller 112, an audio processing device 114, a power controller 116, and the like, The computing system 100, in at least some implementations, is a computer, laptop, mobile device, server, vehicle human-machine interface, or any of various other types of computing systems or devices. It is noted that the number of components of the computing system 100 may vary. It is also noted that in implementations, computing system 100 includes other components not shown in FIG. 1, and the computing system 100, in at least some implementations, is structured differently than shown in FIG. 1.

The fabric 106 is representative of any communication interconnect that complies with any of various types of protocols utilized for communicating among the components of the computing system 100. The fabric 106 provides the data paths, switches, routers, and other logic that connect the host processor 102, parallel processor 104, memory 108, input/output (I/O) interface(s) 110, display controller 112, audio processing device 114, power controller 116, and other devices to each other. The fabric 106 handles the request, response, and data traffic, as well as probe traffic to facilitate coherency. Interrupt request routing and configuration of access paths to the various components of the computing system 100 are also handled by the fabric 106. Additionally, the fabric 106 handles configuration requests, responses, and configuration data traffic. In at least some implementations, the fabric 106 is bus-based, including shared bus configurations, crossbar configurations, and hierarchical buses with bridges. In other implementations, the fabric 106 is packet-based and hierarchical with bridges, crossbar, point-to-point, or other interconnects. From the point of view of the fabric 106, the other components of computing system 100 are referred to as "clients". The fabric 106 is configured to process requests generated by various clients and pass the requests on to other clients.

The memory 108 includes system memory or another storage component that is implemented using a non-transitory computer readable medium, such as dynamic random-access memory (DRAM), Static Random Access Memory (SRAM), NAND Flash memory, NOR (Not Or) flash memory, Ferroelectric Random Access Memory (FeRAM), or others. The I/O interface(s) 110 is representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to the I/O interface(s) 110. Such peripheral devices include (but are not limited to) displays, keyboards, mice, printers, scanners, joysticks or other types of game controllers, media recording devices, external storage devices, network interface cards, and so forth.

The audio processing device 114, such as an audio controller, generates audio signals that can be output by the audio processing device 114 or another component of the computing system 100. The power controller 116, such as a system management unit (SMU) or another type of power controller, includes hardware and firmware for managing and accessing system configuration/status registers and memories, generating clock signals, controlling power rail voltages, and the like for the computing system 100. The power controller 116 also controls the power supplied to components and sub-components of the computing system 100, such as the cores of the host processor 102, parallel processor 104, the I/O interface 110, the display controller 112, and the like.

The host processor 102, in at least some implementations, is a processor such as a central processing unit (CPU) or is a processing device external to the CPU, and supports the execution of instructions for graphics and other types of workloads. For example, the host processor 102 executes instructions, such as program code 118, stored in the memory 108 and stores information in the memory 108, such as the results of the executed instructions. In another example, the host processor 102 prepares and distributes one or more operations to the parallel processor 104 (or other computing resources) and then retrieves the results of one or more operations from the parallel processor 104. The host processor 102 is also able to initiate graphics processing by issuing draw calls. In at least some implementations, the host processor 102 includes multiple processing elements (not shown in FIG. 1 in the interest of clarity) that execute instructions concurrently or in parallel. The processing elements are referred to as processor cores, compute units, or using other terms.

The parallel processor 104, in at least some implementations, is a processor such as a vector processor, a graphics processing unit (GPU), a general-purpose GPU (GPGPU), a non-scalar processor, a highly-parallel processor, an artificial intelligence (AI) processor, an inference engine, a machine learning processor, another multithreaded processing unit, a digital signal processor (DSP), a field programmable gate array (FPGA), an application specific integrated circuit (ASIC), or the like. The parallel processor 104, in at least some implementations, is constructed as a multi-chip module (e.g., a semiconductor die package) including two or more base integrated circuit (IC) dies communicably coupled together with bridge chip(s) or other coupling circuits or connectors such that a parallel processor is usable (e.g., addressable) like a single semiconductor integrated circuit. As used herein, the terms "die" and "chip" are interchangeably used. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as non-semiconductor packaging substrates including printed circuit boards, interposers, and possibly others) are assembled in a multi-die parallel processor.

In at least some implementations, the parallel processor 104 is an accelerated processor (AP) that combines, for example, a general-purpose CPU and a GPU. The AP accepts both compute commands and graphics rendering commands from the host processor 102 or another processor. The AP includes any cooperating collection of hardware, software, or a combination thereof that performs functions and computations associated with accelerating graphics processing tasks, data-parallel tasks, nested data-parallel tasks in an accelerated manner with respect to resources such as conventional CPUs, conventional GPUs, and combinations thereof. The AP and the host processor 102, in at least some implementations, are formed and combined on a single silicon die or package to provide a unified programming and execution environment. In other implementations, the AP and the host processor 102 are formed separately and mounted on the same or different substrates.

The parallel processor 104 includes one or more processing elements, such as an array of compute units (not shown in FIG. 1 in the interest of clarity) that execute instructions concurrently or in parallel. Some implementations of the parallel processor 104 are used for general-purpose computing. The parallel processor 104 executes instructions stored in the memory 108 and stores information in the memory 108, such as the results of the executed instructions. For example, the memory 108 stores a copy 120 of instructions that represent a program code that is to be executed by the parallel processor 104. The parallel processor 104 also includes a timing reference/generator 122.

The parallel processor 104, among other things, renders images and generates a stream of frames for presentation by one or more display devices 124 (illustrated as display device 124-1 and display device 124-2), which may include, for example, a screen, a monitor, a television, etc. For example, the parallel processor 104 renders objects to produce values of pixels that are provided by the display controller 112 to the one or more display devices 124, which use the pixel values to display an image that represents the rendered objects. In implementations where multiple display devices 124 are coupled to the computing system 100, the parallel processor 104 generates the same image(s) to be presented on each display device 124 or generates a different image(s) to be presented on two or more of the display devices 124.

The display controller 112 reads out the pixel values in the frames from an output buffer/memory and uses the values to generate one or more signals for displaying an image on (or presenting an image to) the display device 124. The display controller 112 provides the video signal representing the frames via a physical interface, such as a high-definition multimedia interface (HDMI) or DisplayPort interface, coupled to the display devices 124. The display controller 112 includes one or more timing references/generators 126 that generate control signals, synchronization signals, clock signals (independently or in conjunction with other circuitry or devices), a combination thereof, or the like that are required for interfacing to the display device 124. In at least some implementations, the one or more timing references 126 are synchronized to, for example, the parallel processor timing reference 122 (or another timing reference) during normal operation. Some implementations of the timing reference 126 are implemented in a timing controller (TCON) chip 128, e.g., as an ASIC or other circuit, which also performs timing and synchronization operations for the display device 124. Although the display controller 112 is illustrated in FIG. 1 as being separate from other components of the computing system 100, the display controller 112, in other examples, is part of another component(s), such as the parallel processor 104, the I/O interface 110, or the like.

In at least some implementations, the parallel processor 104 further includes one or more security processors 130. The security processor 130, in at least some implementations, is a set of hardware structures generally configured to create, monitor, and maintain a secure environment, such as a confidential computing environment, for the parallel processor 104. For example, in at least some implementations, the security processor 130 is configured to manage the boot process for the parallel processor 104, initialize security-related mechanisms for the parallel processor 104, monitor the computing system 100 for suspicious activity or events, and implement an appropriate response. In some implementations, the security processor 130 includes a microcontroller, a cryptographic coprocessor (CCP) to encrypt and decrypt data, local memory, and local registers to store, for example, cryptographic keys, and includes interfaces to interact with the memory 108, the I/O controller of the parallel processor 104, and configuration registers of the parallel processor 104. In some implementations, the security processor 130 includes Environment Management Control hardware that performs environmental and security checks to ensure that the parallel processor 104 operates according to specified security parameters.

Figure 2:
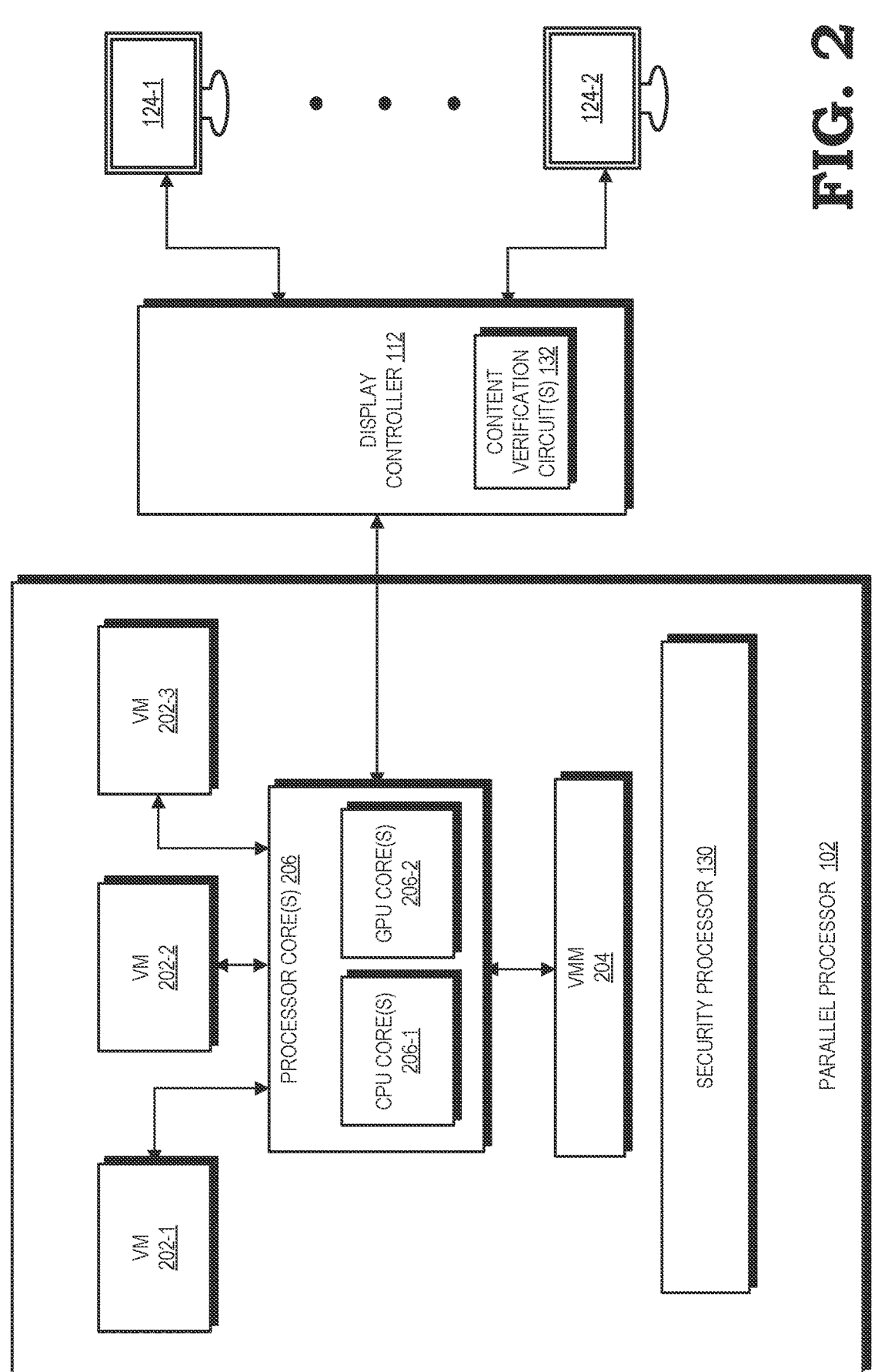
FIG. 2 is a block diagram of portions of the computing system of FIG. 1 implementing a virtualized computing environment in accordance with implementations.

The computing system 100, in at least some implementations, further includes one or more virtualized computing environments 200 (FIG. 2) implemented by the host processor 102, the parallel processor 104, or a combination thereof. For example, FIG. 2 shows an example of the parallel processor 104 implementing multiple virtual machines (VMs) 202 (illustrated as VM (1) 202-1 to VM (N) 202-3). In at least some implementations, the VMs 202 are configured in the system memory 108 of the computing system 100. Resources from physical devices of the parallel processor 104 and the computing system 100 are shared with the VMs 202. The resources include, for example, a graphics processor resource from the parallel processor 104, a central processing unit resource from the host processor 102 or the parallel processor 104, a memory resource from memory 108, a network interface resource from a network interface controller, or the like. The VMs 202 use the resources for performing operations on various data (e.g., video data, image data, textual data, audio data, display data, peripheral device data, etc.). In at least some implementations, the computing system 100 includes a plurality of resources, which are allocated and shared amongst the VMs 202.

The computing system 100 also includes a virtual machine manager (VMM) 204 (also known as a virtualization manager or a hypervisor) that manages instances of VMs 202. The VMM 204 is also known as a virtualization manager or virtual machine manager (VMM). The VMM 204 controls interactions between the VMs 202 and the various physical hardware devices, such as the parallel processor 104. The VMM 204 includes software components for managing hardware resources and software components for virtualizing or emulating physical devices to provide virtual devices, such as virtual disks, virtual processors, virtual network interfaces, or a virtual parallel processor for each VM 202. Each VM 202 is an abstraction of a physical computer system and may include an operating system (OS) and applications, which are referred to as the guest OS and guest applications, respectively, wherein the term "guest" indicates it is a software entity that resides within the VMs 202.

The VMs 202 generally are instanced, meaning that a separate instance is created for each of the VMs 202. It should be understood that a host system may support any number N of virtual machines. As illustrated, the VMM 204 provides N virtual machines 202, with each of the virtual machines 202 providing a virtual environment wherein guest system software resides and operates. The guest system software includes applications (not shown) and VM kernel mode drivers (KMDs) (not shown), typically under the control of a guest OS. The VM KMDs control the operation of the parallel processor 104 by, for example, providing an API to software (e.g., applications) executing on the host processor 102 to access various functions of the parallel processor 104. In some implementations, the computing system 100 comprises containers instead of, or in addition to, the VMs 202. In at least some of these implementations, the computing system 100 also comprises a container manager instead of, or in addition to, the VMM 204.

In the virtualized computing environment 200, when the parallel processor 104 is used to manage multiple display devices 124, each VM 202 is allocated a portion of the parallel processor's 104 resources. This includes both processing power and graphics rendering capabilities provided by the processing core(s) 206 (e.g., CPU core(s) 206-1 and GPU core(s) 206-2). In at least some implementations, this allocation is managed through the use of the physical functions (PFs) and virtual functions (VFs). In at least some implementations, the GPU resources of the parallel processor 104 are virtualized using, for example, GPU-Pass-through. This allows multiple VMs 202 to share the GPU resources. Each VM 202 is allocated a VF, which acts as a virtual GPU. Within each VM 202, applications or processes that require graphics rendering use the allocated VF (virtual GPU). The VM's 202 operating system and drivers interact with this VF as if it were a physical GPU, rendering images accordingly.

Each VM 202, in at least some implementations, is connected to one or more of the display devices 124. The GPU resource of the parallel processor 104 allocates separate resources for each display, ensuring that they can operate independently and display different content. Once the images are rendered within each VM 202, the images are sent to the assigned display devices 124. This transmission is a coordinated effort involving the parallel processor's 104 hardware capabilities and virtualization software, which ensures that each display device 124 receives the correct image output from the respective VM 202.

In some instances, visual content within a frame output by a parallel processor or another processor may not be displayed correctly on a display device. The visual content or a portion thereof may be corrupted, misrepresented, omitted, or the like. For example, in some instances, a processing device, such as a CPU or CPU, includes errors or compromises that cause the displayed content to be incorrect. Software, including applications and the operating system, running on host processor 102 is typically considered untrusted from a functional safety standpoint. Because this software is involved in the composition and dispatch of content to the display devices 124, it is difficult to prevent the software from potentially disrupting the output of desired visual content of interest. Such disruptions may be caused by a combination of either malicious software or unintentional software bugs. Consider an example where the computing system 100 is implemented within a vehicle, such as an automobile or an airplane. In this example, visual content, such as a check engine light, is to be presented on one of the display devices 124 of the vehicle. However, due to malicious software executing on the host processor 102, the check engine light is omitted from the display device 124 or is presented in a corrupted form. In another example, the computing system 100 is a gaming system, and the visual content to be presented on the display device 124 is a mini-map within a video game. However, due to malicious software executing on the host processor 102 or a software bug, the mini-map is not displayed or is displayed in the video game with incorrect information.

As such, the computing system 100 includes one or more visual content verification circuits 132 (also referred to herein as "content verification circuits 132") and one or more error detection circuits 134 to verify that visual content is being presented on the display device 124 as expected. In at least some implementations, the content verification circuit 132 is implemented in the display controller 112, and the error detection circuit 134 is implemented within the host processor 102. However, other configurations are applications as well. For example, in other implementations, another processor or microcontroller implements the error detection circuit 134, and another component of the parallel processor 104 or a display device 124 implements the content verification circuit(s) 132. Also, although the following techniques are described with respect to the host processor 102, one or more of these techniques, in other implementations, are employed by a different processor of the computing system 100.

As described in greater detail below, the content verification circuit 132 calculates a derived value (e.g., a cyclic redundancy checksum) representing a region of pixel data (e.g., defining the visual COI) obtained from the display controller 112 corresponding to a region of interest (ROI) specified by the host processor 102 as frames are scanned out to the display interface. The content verification circuit 132 sends the ROI coordinates and calculated derived value to the host processor 102 on, for example, a per-frame basis or according to another timing interval. In other implementations, the security processor 130 obtains the ROI coordinates and calculated derived value from the display controller 112 and sends this information over to the host processor 102. In at least some implementations, the content verification circuit 132 or the security processor 130 transmits the ROI coordinates and calculated derived value to the host processor 102 using the inter-integrated circuit (I2C) communication protocol or another communication protocol.

The host processor 102 receives the ROI coordinates and calculated derived value from either the content verification circuit 132 or the security processor 130 and uses this information to determine if visual COI was presented correctly (e.g., the visual content was actually presented and was presented without modification, corruption, or misrepresentation) on one or more of the display devices 124 based on the signals received from the display controller 112. Stated differently, the host processor 102 determines if a specified region of the display devices 124 is displaying (or displayed) the expected pixel content (e.g., visual COI). For example, the host processor 102, in at least some implementations, compares the received derived value to a derived value expected for the ROI coordinates received from the content verification circuit 132 or the security processor 130. If the derived values match, the host processor 102 determines that the visual COI was displayed correctly. However, if the derived values do not match, the host processor 102 determines that the visual COI was displayed incorrectly and performs one or more recovery actions, such as regenerating the visual content.

Figure 3:
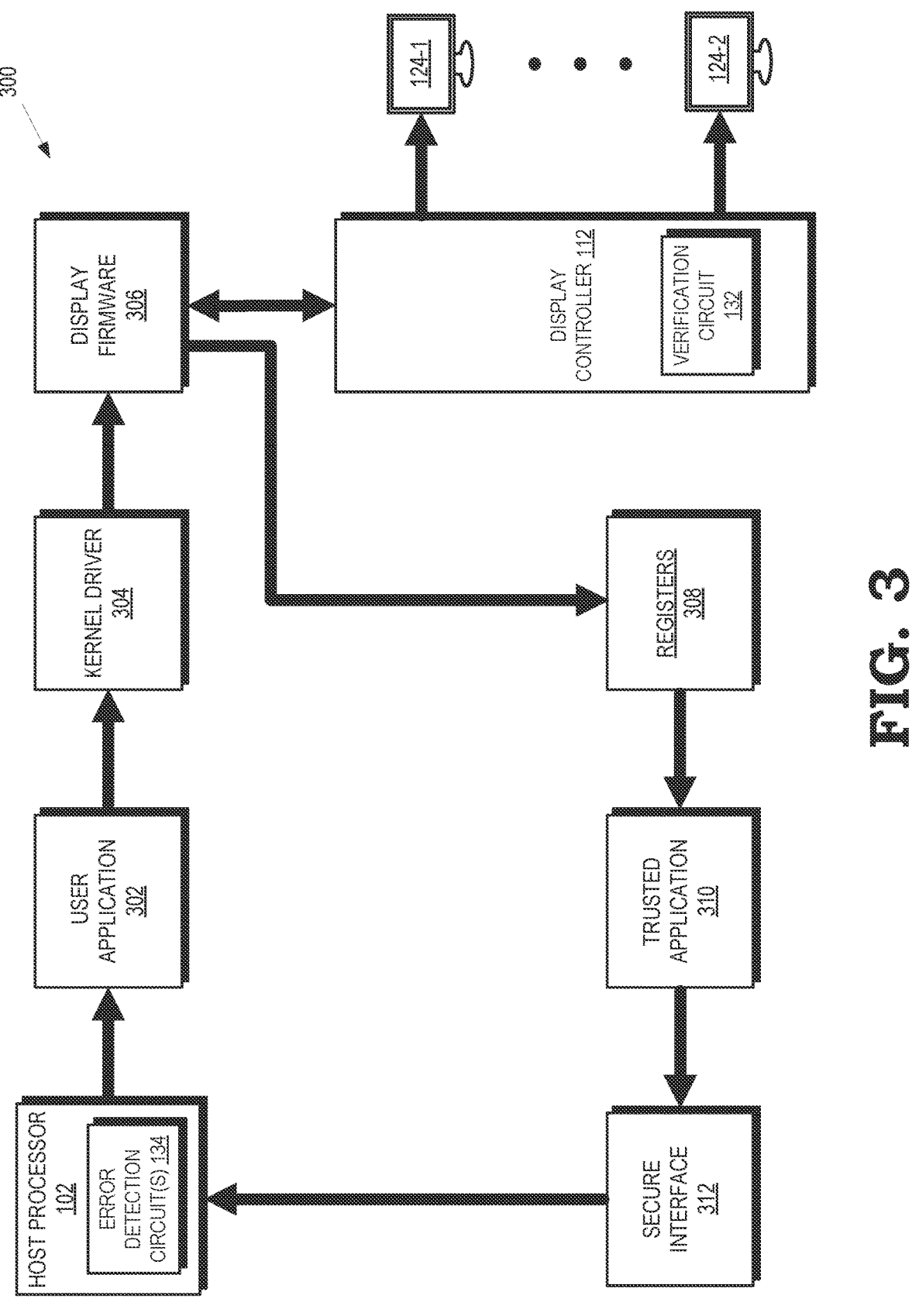
FIG. 3 is a block diagram illustrating various components implemented by the computing system of FIG. 1 for verifying that visual content of interest is displayed as intended in accordance with at least some implementations.
Figure 4:
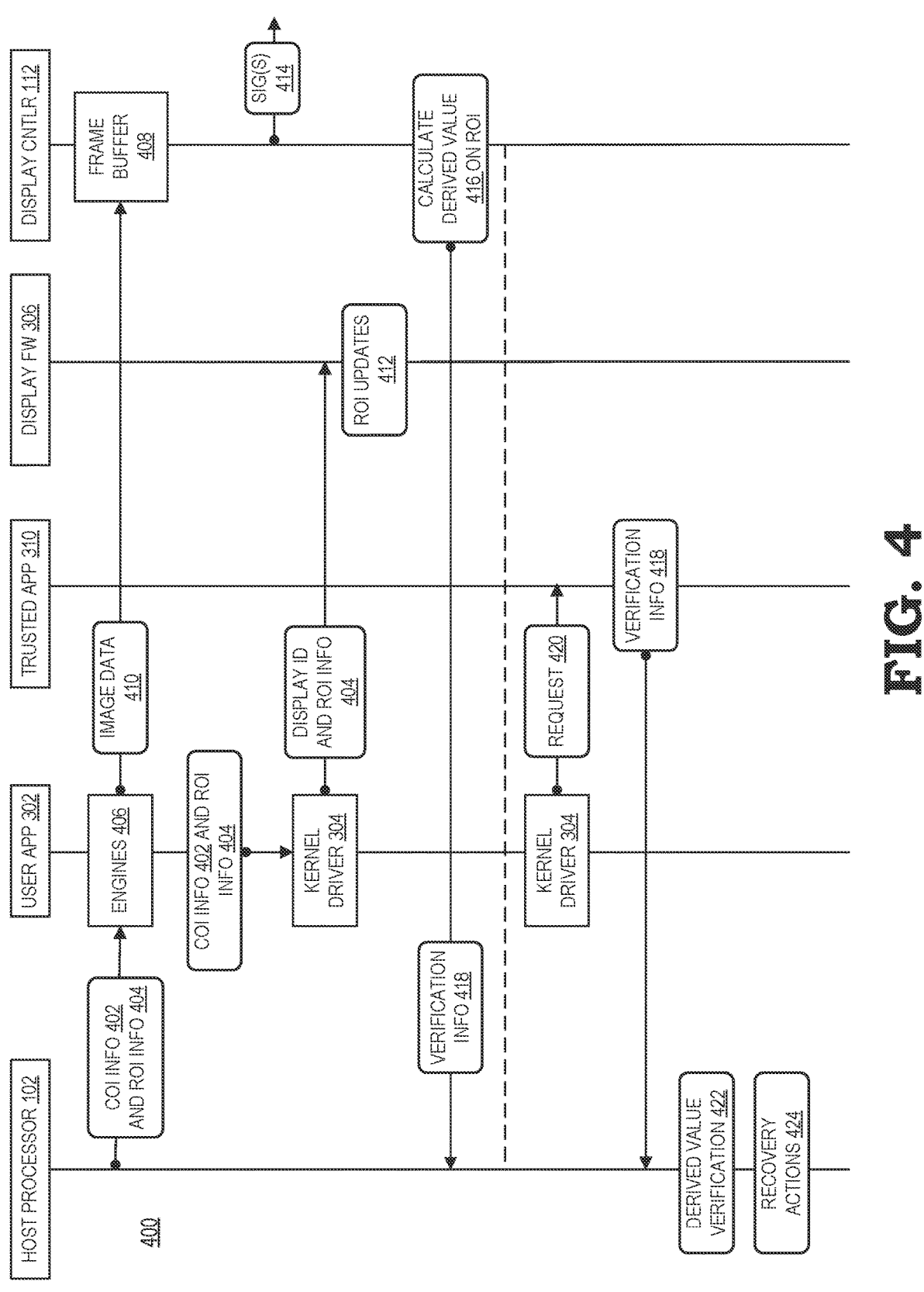
FIG. 4 is a transaction diagram illustrating operations performed between the components of the computing system of FIG. 1 for verifying that visual content of interest is displayed as intended in accordance with at least some implementations.

FIG. 3 is a block diagram 300 illustrating the various components implemented by the computing system 100 for verifying that visual COI is displayed as intended in accordance with at least some implementations. FIG. 4 is a transaction diagram 400 illustrating the operations performed by the components shown in FIG. 3 in accordance with at least some implementations. FIG. 3 and FIG. 4 will be discussed together. In the example shown in FIG. 3, the computing system 100 implements the host processor 102, a host processor user application 302 (herein referred to as "user application 302"), the parallel processor 104, a kernel/display driver 304 (also referred to herein as "driver 304"), display firmware 306, the display controller 112, registers 308, a trusted application 310, and a secure interface 312. The user application 302 and the kernel driver 304 are executed by the host processor 102 (or another processor). The display firmware 306, display controller 112, and the registers 308 are part of the parallel processor 104. The trusted application 310 is part of the security processor 130. The secure interface 312 is implemented by the secure processor 130 and the host processor 102.

Referring now to FIG. 4, when visual content is to be displayed on one or more display devices 124, a processor of the computing system 100, such as the host processor 102 or another processor, determines if the visual content or a portion thereof is content of interest and, if so, also determines what is the ROI in the frame or display device 124 for displaying the visual COI. In at least some implementations, visual content is determined to be content of interest based on attributes of the content, such as content type, content location, information represented by the content, content shape, content size, content duration, a combination thereof, or the like. The ROI for visual COI, in at least some implementations, is determined based on similar attributes, information received from the application generating the image data, a combination thereof, or the like.

In response to detecting visual COI and determining the ROI for the visual COI, the host processor 102 generates COI information 402 (FIG. 4) and ROI information 404 (FIG. 4) for a current frame. The COI information 402, in at least some implementations, designates or identifies at least some of the visual content as being of interest or critical. In at least some implementations, the COI information 402 also includes an identifier indicating which visual COI is to be rendered. In other implementations, this COI identifier is separate from the COI information 402. The ROI information 404, in at least some implementations, indicates pixel coordinates corresponding to one or more ROIs that include the visual COI in the frame or on the display device 124. In at least some implementations, the ROI information 404 indicates the windowed subsection of the display device 124 in which to render the visual COI. In at least some implementations, the COI information 402 or the ROI information 404 also includes an identifier indicating the display device the visual COI is to be rendered on. However, in other implementations, this target display device identifier is separate from the COI information 402 and the ROI information 404. In some implementations where a single display device is implemented, compared to multiple display devices, the target display device identifier is not generated.

The host processor 102 sends the COI information 402 and the ROI information 404 to the user application 302. The user application 302 passes at least a portion of this information to composition/rendering engines 406 to update the display device(s) 124 with the visual COI. For example, the composition/rendering engines 406 create the images that are to be displayed on the display device(s) 124 by executing various graphics processing tasks, such as rendering, texture mapping, shading, and other operations necessary to create a complete frame. Once a frame comprising the visual COI is rendered, the frame is stored in a frame buffer 408 as image data 410, which can include multiple frames for different display devices 124. The frame buffer 408 holds the final image that is to be displayed on the display device(s) 124.

In addition to passing the COI information 402 and ROI information 404 to the composition/rendering engines 406, the user application 302 also provides at least a portion of this information, such as the ROI information 404 and the target display identifier to the kernel driver 304, which acts as an ROI manager. In at least some implementations, the kernel driver 304 driver receives the target display identifier and ROI information 404 via a cathode ray tube controller (CRTC) property. The kernel driver 304 provides the target display identifier and ROI information 404 to the display firmware 306 for further processing. For example, the display firmware 306 populates one or more of the registers 308, such as scratch registers, with information representing the ROI information 404, the target display identifier, an identifier of the output timing generator (OTG) (e.g., the timing reference/generator 126) currently routed to the physical output of the display controller 112, a combination thereof, or the like. The information representing the ROI information 404 in the register 308 includes, for example, the vertical and horizontal start and end locations of the ROI for the display device 124. As the display firmware 306 receives new ROI information 404 from the kernel driver 304, the display firmware 306 performs ROI updates 512 by, for example, storing the received ROI information 404 in the registers 308. For example, in at least some implementations, the display firmware 306 updates registers 308 with new ROI information 404 for each of the display devices 124 during the frame duration. In at least some implementations, the ROI information 404 is updated by the display firmware 306 at the beginning of each line of the corresponding frame to prevent the user application 302 from changing the ROI information 404.

When visual content is to be presented on a display device 124, the display controller 112 takes image data 410 from the frame buffer 408 and converts the image data 410 into one or more signals 414. The image data 410 includes, for example, pixel data such as pixel values for the image or frame to be displayed, frame information (e.g., frame resolution, color depth, color format, etc.), metadata (e.g., color calibration data, high dynamic range (HDR) information, etc.). The signal(s) 414 includes information regarding colors, brightness, pixel position, and anything else needed to create the image on the display device(s) 124. The display controller 112 outputs the signal(s) 414 to display device(s) 124 through one or more display interfaces.

In addition to outputting the signal(s) 414 to display device(s) 124, the display controller 112 also performs one or more processes on visual COI to verify that this visual content was generated or displayed as intended. As described above, in at least some implementations, the display controller 112 includes a content verification circuit 132. In at least some implementations, the content verification circuit 132 determines if the current visual content includes content of interest by searching the registers 308. If the registers 308 include ROI information 404 (or a representation thereof), the content verification circuit 132 determines that the current visual content includes content of interest. In response to this determination, the content verification circuit 132 performs a hardware-based derived value generation process, such as calculating a derived value 416 (also referred to herein as a "checksum 416") representing a region of pixel data (e.g., visual COI) obtained from the display controller 112 as frames are scanned out to the display interface. One example of a derived value 416 is a checksum, such as a cyclic redundancy checksum (CRC). The region of pixel data obtained for the display controller 112 corresponds to a region of interest (ROI) specified by the host processor 102.

For example, the content verification circuit 132 determines the ROI from the ROI information 404 stored in the registers 308. The content verification circuit 132 obtains the pixel data, such as color information (e.g., red, green, blue, and alpha values), for each pixel within the ROI from the display controller 112. In at least some implementations, the content verification circuit 132 obtains the pixel data as frames are scanned out to the display interface. In other implementations, the content verification circuit 132 obtains the pixel data prior to the frames being scanned out. The content verification circuit 132, in at least some implementations, converts or formats the raw pixel data into a data stream that can be processed by the derived value generation process. For example, the content verification circuit 132 linearizes the data or structures the data into a sequence of bytes. The content verification circuit 132, in at least some implementations, implements a CRC and initializes the CRC value to zero or another predefined value. The content verification circuit 132 then performs the CRC calculation on the pixel data. For example, the content verification circuit 132 divides the pixel data by the CRC polynomial using binary division. The remainder of this division is the derived value 416, which, in this example, is a checksum (e.g., CRC value). It should be understood that other derived values 416, in addition to a CRC, are applicable as well.

Once the derived value 416 is calculated, the content verification circuit 132 stores the derived value 416 in one or more of the registers 308. The derived value 416, in at least some implementations, is associated with or mapped to its corresponding ROI. In at least some implementations, the content verification circuit 132 is implemented in the OTG (e.g., the timing references/generators 126) of the display controller 112. In these implementations, since the derived value 416 is calculated in the OTG, the derived value 416 reflects the final composition of the display pixels, including any scaling, mixing, and cursors introduced by the display controller 112 before the OTG.

The content verification circuit 132 (or another component), in at least some implementations, sends content verification information 418 to the host processor 102 using, for example, local atomic operations (or "functions"), direct register accesses, messages sent on a data bus, a combination thereof, or the like. In at least some implementations, the content verification circuit 132 includes an ROI/value pair comprised of the derived value 416 calculated for the visual COI and associated ROI. The content verification circuit 132, in at least some implementations, implements one or more synchronization mechanisms to ensure that the correct derived value 416 is paired with the corresponding ROI information 404. For example, the content verification circuit 132 sends the derived value 416 and the ROI information 404 to the host processor 102 during the next vertical blanking interval to prevent the derived value 416 calculated for frame N from being sent to the host processor 102 with the ROI for frame N+1 (or vice versa).

In other implementations, the security processor 130 sends the content verification information 418 to the host processor 102. In these implementations, the security processor 130 obtains the content verification information 418 from the display controller 112 and sends this information to the host processor 102. For example, the content verification circuit 132 sends the content verification circuit 132 to the security processor 130. In another example, the security processor 130 obtains the content verification information 418 from the registers 308 or another component maintaining the content verification information 418. In at least some implementations, the security processor 130 obtains the content verification information 418 from the registers 308 on a per-frame basis or based on another timing interval.

The security processor 130, in at least some implementations, implements one or more synchronization mechanisms to ensure that the correct content verification information 418, including the correct derived value 416 and ROI information 404 pair, is obtained from the display controller 112. For example, the trusted application 310 (or another component) of the security processor 130 waits to obtain the content verification information 418 until an ROI/value command 420 is received from the kernel driver 304 (or another component) before obtaining the content verification information 418 from the registers 308. The ROI/value command 420 triggers the trusted application 310 to at least one of obtain the content verification information 418 from the display controller 112 or transmit content verification information 418 to the host processor 102.

In at least some implementations, a component of the kernel driver 304, such as the vertical synchronization (VSYNC) interrupt handler, sends the ROI/value command 420 to the trusted application 310. The kernel driver 304, in at least some implementations, sends an ROI/value command 420 to trusted application 310 each frame as long as the display identifier (if multiple display devices 124 are being managed) and the ROI have not changed during the previous frame. In at least some implementations, when the display identifier and ROI have been updated, the kernel driver 304 suppresses transmission of the ROI/value command 420 for the next occurring VSYNC and resumes transmission of the ROI/value command 420 on the following VSYNC boundary. By suppressing transmission of the ROI/value command 420, the trusted application 310 is prevented from performing ROI/value readouts during the frame in which the derived value 416 may not correspond to the updated ROI.

In at least some implementations, when obtaining the content verification information 418, the trusted application 310 determines the ROI/value pair for a specified display device 124 by reading the ROI information 404 and the associated OTG identifier from the relevant register(s) 308. The trusted application 310 then uses the OTG identifier to determine which registers 308 include the derived value 416 calculated for the ROI represented by the ROI information 404. Stated differently, the trusted application 310 uses the OTG identifier as an index into stored derived value data to identify the derived value 416 calculated for the ROI represented by the ROI information 404. Once the security processor 130 has obtained content verification information 418, the security processor 130 sends the content verification information 418 to the host processor 102. In at least some implementations, the security processor 130 transmits the content verification information 418 to the host processor 102 using a secure communication channel, such as a secure I2C communication channel, provided by the secure interface 312.

After the host processor 102 receives the content verification information 418 from the content verification circuit 132 or the security processor 130, the error-detection circuit 134 of the host processor 102 performs one or more error-detection or verification processes 422 to check the validity of the received derived value 416 and ROI information 404. For example, the error-detection circuit 134 compares the received derived value 416 to a derived value previously calculated for the ROI represented by the host processor 102 (or another component). In another example, when the host processor 102 receives the content verification information 418, the error-detection circuit 134 calculates a derived value for the visual COI expected to be displayed in the ROI based on the COI information 402 or other image data generated by the host processor 102. In at least some implementations, the COI information 402 is pre-determined, and thus, the expected checksum is known a priori. Therefore, in these implementations, the host processor 102 mirrors/repeats the checksum calculation against the COI information 402 to determine the expected checksum. If the received derived value 416 is not the expected derived value for the visual COI, the error-detection circuit 134 determines that an error or fault has occurred and performs one or more recovery actions 424, such as regenerating the visual COI.

Figure 5:
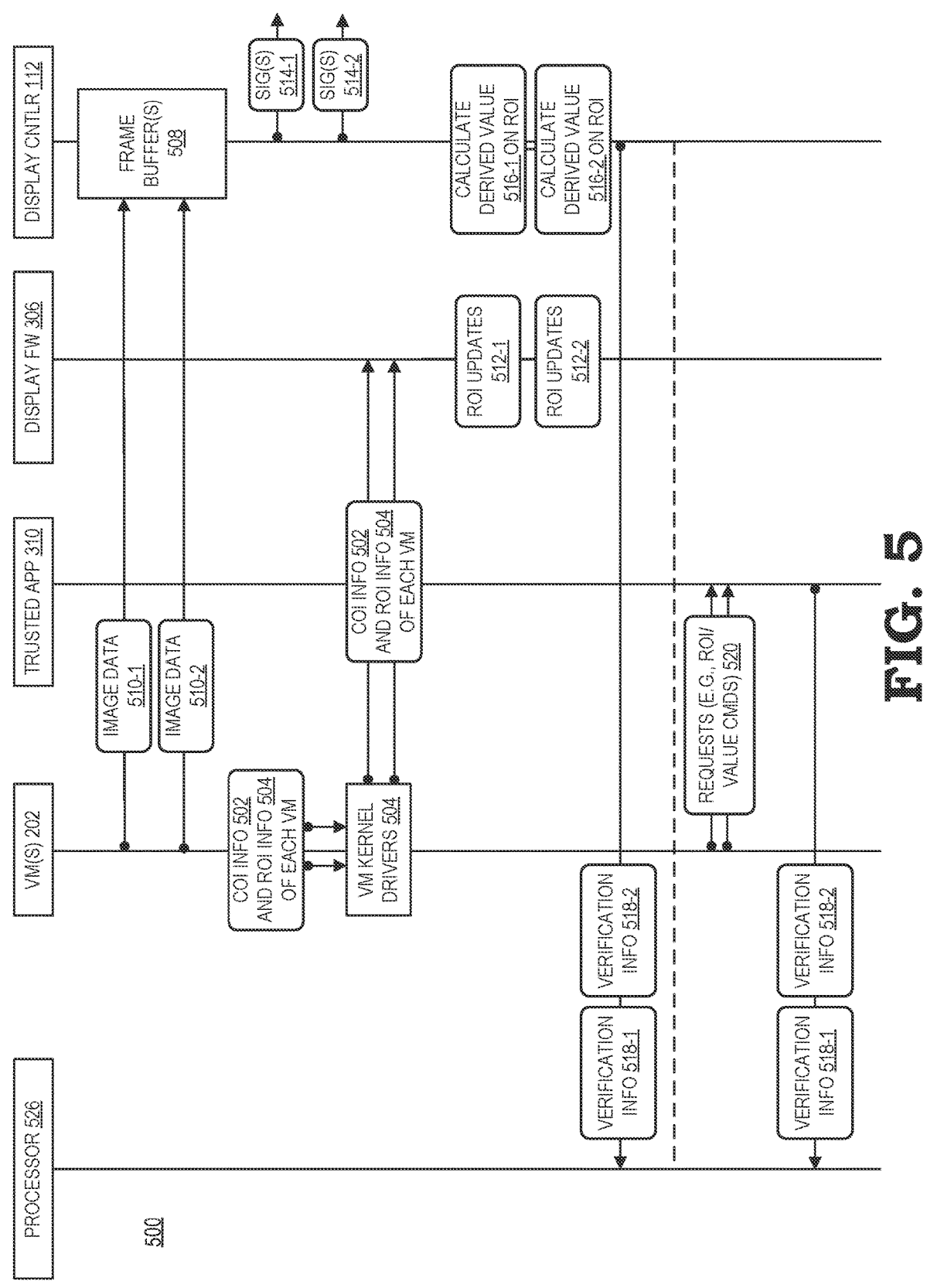
FIG. 5 is a transaction diagram illustrating operations performed between the components of the computing system of FIG. 2 for verifying that visual content of interest is displayed as intended in accordance with at least some implementations.

As described above, in at least some implementations, the computing system 100 implements a virtualized computing environment 200. In these implementations, the descriptions provided above with respect to FIG. 2 and FIG. 3 are also applicable. However, in these implementations, the display controller 112 receives image data 510 for each of the multiple display devices 124, as shown in FIG. 5. It should be understood that FIG. 5 does not include one or more components of FIG. 4 for brevity. The VMM 204 allocates a virtual GPU to each VM 202. Each VM is also allocated one or more display devices 124. Applications and processes within each VM 202 render image data 510 using their allocated virtual GPU. The VMM 204 or a domain of at least one VM 202 receives the image data 510 generated by the VMs 202 and routes the image data 510 to a corresponding section of the physical GPU 206 of the parallel processor 104 for processing. The physical GPU 206 sends the processed image data 510 to the display controller 112. The VMM 204 (or domains) ensures that the display controller 112 receives the correct image data for each connected display device 124 corresponding to the respective VMs 202.

Accordingly, as shown in FIG. 5, the display controller 112 receives multiple sets of image data 510 (illustrated as image data 510-1 and image data 510-2) from the VMs 202 via the VMM 204 and physical GPU, which are not shown in FIG. 5 for brevity. All from the physical GPU, with one input for each VM 202. The image data 510 generated by each of the VMs 202 is stored in one or more frame buffers 508, similar to that described above with respect to FIG. 4. When visual content is to be presented on each of the display devices 124, the display controller 112 takes image data 510 from the frame buffer(s) 508 for each display device 124 and converts the image data 410 into one or more signals 514 (illustrated as signal 514-1 to 514-4). The display controller 112 then outputs the signal(s) 514 to display devices 124 through one or more display interfaces.

In the virtualized environment 200, COI information 502 and ROI information 504 are determined by each VM 202 and passed to the composition/rendering engines (not shown) and the kernel driver 304 of the VM 202, similar to that described above with respect to FIG. 4. The kernel driver 304 of each VM 202 (or the VMM 204) sends the COI information 502 and ROI information 504 to the display firmware 306, which populates one or more registers 308 based on the received COI information 402 and ROI information 404. The display firmware 306 performs multiple instances of the ROI updates 512 (illustrated as ROI updates 512-1 and ROI updates 512-2) given that display firmware 306 receives different sets of COI information 402 and ROI information 404 for image data 510 to be displayed on different display devices 124.

The content verification circuit 132 then performs the hardware-based derived value generation process described above with respect to FIG. 4. However, in the virtualized environment 200, the content verification circuit 132 performs multiple instances of the derived value generation process, one for each frame being displayed by each display device 124. For example, for each display device 124, the content verification circuit 132 determines the ROI from the ROI information 504 stored in the registers 308 for the display device 124. The content verification circuit 132 then calculates the derived value 516 (illustrated as derived value 516-1 and derived value 516-2) for the set of pixel data in the ROI for the display device 124. The content verification circuit 132 stores the multiple derived values 516 in one or more registers 308.

The content verification circuit 132 or the security processor 130 then sends multiple instances of content verification information 518 (illustrated as verification information 518-1 and verification information 518-2) to an external processor 526 (such as the host processor 102 or another processor), the VMM 204, or the VMs 202. As described above, the content verification information 518 includes an ROI/value pair comprised of the derived value 516 calculated for the visual COI and associated ROI. In at least some implementations employing the security processor 130, the security processor 130 receives, on a per-frame basis, a request 520 (also referred to herein as "ROI/value command 520") from the driver(s) 304 to read and send the verification information 518 derived from the verification circuit 132. The driver(s) 304, in at least some implementations, sends the request(s) 520 in response to receiving an ROI setting request. The request 520 triggers the security processor 130 to at least one of obtain content verification information 518 from the display controller 112 or transmit content verification information 518 to the VMMs 204 or an external processor. After the security processor 130 has obtained one or more instances of content verification information 518, the security processor 130, on a per-frame basis, sends the content verification information 518 to a host processor 102, an external processor 526, a VMM 204, VM 202, or other component that provides the COI/ROI information. The error-detection circuit 134 performs one or more error-detection or verification processes (not shown in FIG. 5) to check the validity of the received derived value 516 and ROI information 504, similar to that described above with respect to FIG. 4.

Figure 6:
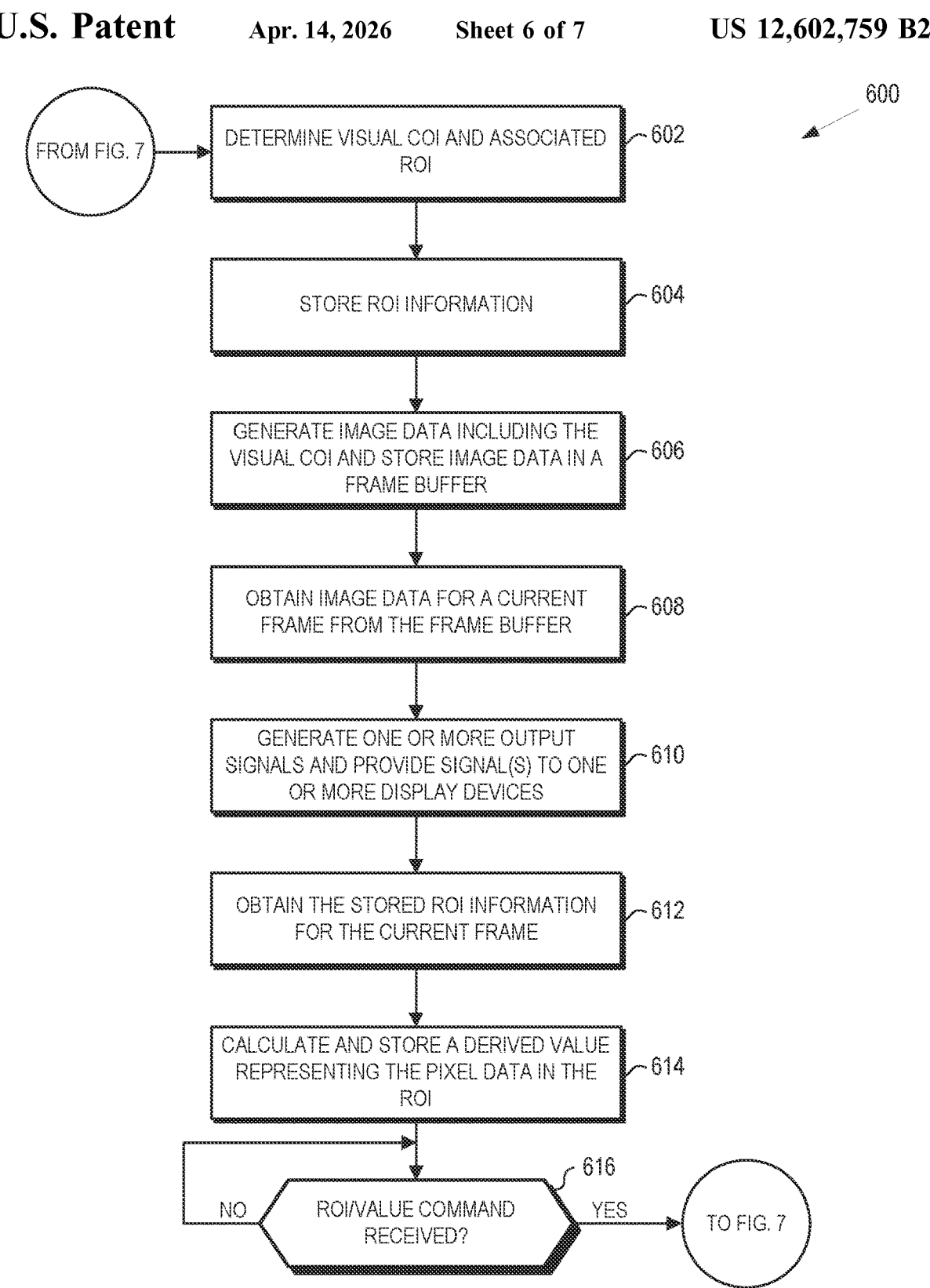
FIG. 6 and FIG. 7 together are a flow diagram illustrating an example method of verifying visual content of interest is displayed as intended within a region of interest of one or more display devices in accordance with at least some implementations.
Figure 7:
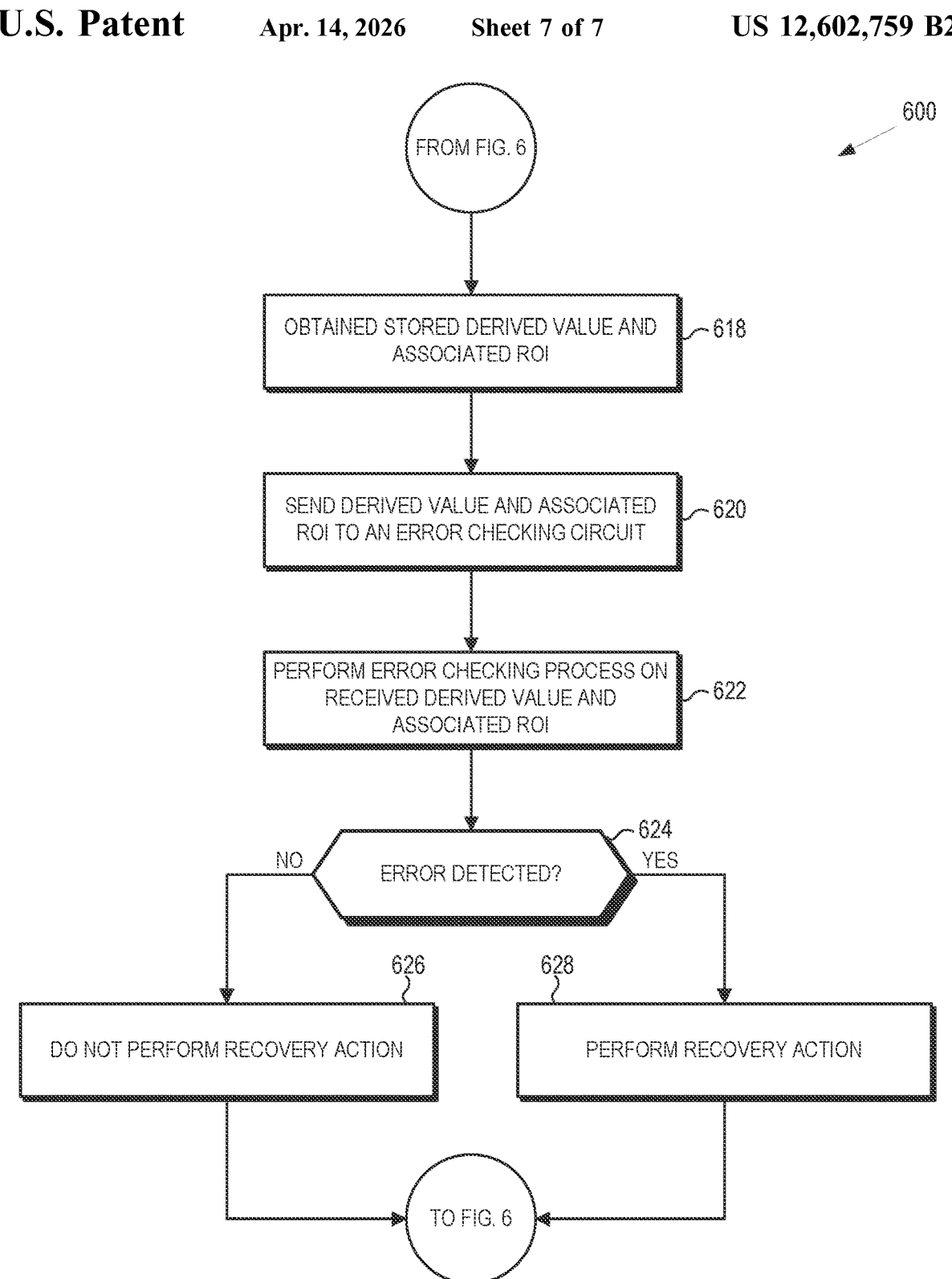

FIG. 6 and FIG. 7 are diagrams together illustrating an example method 600 of a computing system verifying that visual content of interest is displayed as intended within a region of interest in accordance with at least some implementations. It should be understood that the processes described below with respect to method 600 have been described above in greater detail with reference to FIG. 1 to FIG. 5. For purposes of description, the method 600 is described with respect to an example implementation at the computing system 100 of FIG. 1 or FIG. 2, but it will be appreciated that, in other implementations, the method 600 is implemented at processing devices having different configurations. Also, the method 600 is not limited to the sequence of operations shown in FIG. 6 and FIG. 7, as at least some of the operations can be performed in parallel or in a different sequence. Moreover, in at least some implementations, the method 600 can include one or more different operations than those shown in FIG. 6 and FIG. 7.

At block 602, an external processor 526 (e.g., a host processor 102) or one or more VMs 202 determines visual COI information 402 and ROI information 404 for visual content to be presented at one or more display devices 124. At block 604, at least a portion of the COI information 402 and ROI information 404, such as a target display identifier and the ROI information, is sent to the display firmware 306 and stored in one or more registers 308.

At block 606, one or more composition/rendering engines 406 generate image data 410 including the visual COI and stores this image data 410 in one or more frame buffers 408. As described above, if the computing system 100 implements a virtualized computing environment, multiple instances of image data 410 are generated. At block 608, for each current frame to be displayed on a display device 124, the display controller 112 obtains image data 410 for the current frame from the frame buffer 408. At block 610, the display controller 112 generates one or more output signals 414 representing the image data 410 and provides these signals 414 to one or more display devices 124.

At block 612, for each display device 124, the content verification circuit 132 obtains the stored ROI information 404 for the current frame. At block 614, the content verification circuit 132 calculates and stores a derived value 416, representing the pixel data in the ROI for the current frame. At block 616, the security processor 130 determines if a trigger condition has been satisfied, such as receiving at least one request 420 (also referred to herein as "ROI/value command 420") from one or more kernel drivers 304, one or more VMs 202, a VMM 204, or the like. If the trigger condition has not been satisfied, the security processor 130 continues to monitor for the trigger condition. If the trigger condition has been satisfied, the method 600 proceeds to block 618 of FIG. 7, and the security processor 130 obtains one or more stored derived values 416 and associated ROIs. At block 620, the security processor 130 sends the derived value(s) 416 and associated ROI(s) to an error-detection circuit 134. At block 622, the error-detection circuit 134 performs one or more error-checking processes on the received derived value(s) 416. At block 624, the error-detection circuit 134 determines if an error or fault has been identified. If no error or fault is identified, the method 600 returns to block 602 of FIG. 6. At block 626, if an error or fault is identified, a component of the processing system 100, such as a host processor 102, another processor 526, a VMM 204, or a VM 202, performs one or more recovery actions 424, such as regenerating the visual COI. The method 600 then returns to block 602 of FIG. 6.

One or more of the elements described above is circuitry designed and configured to perform the corresponding operations described above. Such circuitry, in at least some implementations, is any one of, or a combination of, a hardcoded circuit (e.g., a corresponding portion of an application-specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components", "units", "devices", "circuitry", etc.) are described or claimed as "configured" to perform one or more tasks or operations.

This formulation of [entity] configured to [perform one or more tasks] is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to". An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

In some implementations, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method, comprising:

generating, at a display controller, a derived value representing visual content of interest (COI) within an image frame for a region of interest (ROI) on at least one display device; and responsive to sending the derived value from the display controller to a processing device that is external to the display controller and external to a display subsystem implementing the display controller, performing, at the processing device, an error-detection process for the visual COI based on the derived value.

2. The method of claim 1, wherein generating the derived value comprises:

obtaining pixel data from the display controller for the ROI; and generating a checksum representing the pixel data.

3. The method of claim 1, wherein performing the error-detection process comprises:

comparing the derived value to an expected derived value for the visual COI at the ROI.

4. The method of claim 1, further comprising:

responsive to detecting an error based on the derived value, performing one or more recovery actions.

5. The method of claim 4, wherein performing the one or more recovery actions comprises:

regenerating the visual COI for presentation on the at least one display device.

6. The method of claim 1, further comprising:

sending, from the display controller, at least the derived value to the processing device.

7. The method of claim 1, further comprising:

obtaining, by a security processor, the derived value from the display controller; and sending, by the security processor, at least the derived value to the processing device for performing the error-detection process.

8. A computing system, comprising:

a display controller having a content verification circuit configured to generate a derived value representing visual content of interest (COI) within an image frame for a region of interest (ROI) on at least one display device; and a processing device external to the display controller and to a display subsystem implementing the display controller, the processing device having an error-detection circuit configured to perform an error-detection process for the visual COI based on the derived value received from the display controller.

9. The computing system of claim 8, wherein the content verification circuit is configured to generate the derived value by:

obtaining pixel data from a display controller for the ROI; and generating a checksum representing the pixel data.

10. The computing system of claim 8, wherein the error-detection circuit is configured to perform the error-detection process by:

comparing the derived value to an expected derived value for the visual COI at the ROI.

11. The computing system of claim 8, wherein the error-detection circuit is further configured to:

responsive to an error being detected based on the derived value, perform one or more recovery actions that include regenerating the visual COI for presentation on at least one display device.

12. The computing system of claim 8, wherein the content verification circuit is implemented in an output timing generator of the display controller.

13. The computing system of claim 12, further comprising:

a security processor configured to:

obtain the derived value from the display controller; and send at least the derived value to the processing device for performing the error-detection process.

14. A method, comprising:

generating, by each virtual machine of a plurality of virtual machines, a set of image data to be presented on at least one display device associated with the virtual machine;

generating, at a display controller for each set of image data, a derived value representing visual content of interest (COI) within the set of image data for a region of interest (ROI) on the at least one display device associated with the virtual machine that generated the set of image data; and performing an error-detection process for each visual COI based on the respective derived value.

15. The method of claim 14, wherein generating the derived value comprises:

obtaining a set of pixel data from the display controller for the ROI on the at least one display device associated with the virtual machine; and generating, for each set of pixel data, a checksum representing the pixel data.

16. The method of claim 14, wherein performing the error-detection process for each derived value comprises:

comparing the derived value to an expected derived value for the visual COI at the ROI.

17. The method of claim 14, further comprising:

responsive to detecting an error based on at least one of the derived values, performing one or more recovery actions.

18. The method of claim 17, wherein performing the one or more recovery actions comprises:

regenerating the visual COI, associated with the at least one of the derived values for which the error was detected, for presentation on the at least one display device.

19. The method of claim 14, further comprising:

sending, from the display controller, each derived value to a processing device that is separate from the display controller; and performing, by the processing device, the error-detection process.

20. The method of claim 14, further comprising:

obtaining, by a security processor, each derived value from the display controller; and sending, by the security processor, each of the obtained derived values to another processor for performing the error-detection process.

* * * * *